(12) United States Patent
Meier

(10) Patent No.: US 8,621,951 B2
(45) Date of Patent: Jan. 7, 2014

(54) DIVIDED TOOTH WHEEL

(75) Inventor: Alex Meier, Triesen (LI)

(73) Assignee: ThyssenKrupp Presta TecCenter AG, Eschen (LI)

( * ) Notice: Subject to any disclaimer, the term of this patent is extended or adjusted under 35 U.S.C. 154(b) by 102 days.

(21) Appl. No.: 13/122,363

(22) PCT Filed: Sep. 3, 2009

(86) PCT No.: PCT/EP2009/006369
§ 371 (c)(1),
(2), (4) Date: Apr. 1, 2011

(87) PCT Pub. No.: WO2010/037457
PCT Pub. Date: Apr. 8, 2010

(65) Prior Publication Data
US 2011/0174105 A1    Jul. 21, 2011

(30) Foreign Application Priority Data

Oct. 4, 2008  (DE) .......................... 10 2008 050 472

(51) Int. Cl.
*F16H 55/18* (2006.01)
(52) U.S. Cl.
USPC .................................. 74/409; 74/440; 74/411
(58) Field of Classification Search
USPC .................................... 74/409, 440, 410, 411
See application file for complete search history.

(56) References Cited

U.S. PATENT DOCUMENTS

| | | | |
|---|---|---|---|
| 3,750,489 A | | 8/1973 | Caldwell |
| 3,803,935 A | * | 4/1974 | Nozawa .......................... 74/409 |
| 3,999,445 A | * | 12/1976 | Liautaud .......................... 74/445 |
| 4,630,496 A | * | 12/1986 | Yasuoka .......................... 74/409 |
| 4,640,147 A | * | 2/1987 | Yasukawa et al. .............. 74/409 |
| 4,688,441 A | * | 8/1987 | Yasukawa et al. .............. 74/409 |
| 4,739,670 A | * | 4/1988 | Tomita et al. ................... 74/409 |
| 4,745,823 A | * | 5/1988 | Morita et al. ................... 74/409 |
| 4,747,321 A | * | 5/1988 | Hannel .......................... 74/440 |
| 4,898,523 A | | 2/1990 | Harwath |
| 4,912,998 A | * | 4/1990 | Sugano et al. .................. 74/409 |

(Continued)

FOREIGN PATENT DOCUMENTS

| | | |
|---|---|---|
| DE | 23 27 566 | 1/1974 |
| DE | 7 405 312 | 5/1974 |
| EP | 0 205 156 A1 | 12/1986 |
| JP | 2000-257698 A | 9/2000 |

OTHER PUBLICATIONS

International Search Report dated Dec. 4, 2009 (two (2) pages).
Form PCT/ISA/237 (six (6) pages).

(Continued)

*Primary Examiner* — David M Fenstermacher
(74) *Attorney, Agent, or Firm* — Crowell & Moring LLP

(57) ABSTRACT

A divided toothed wheel having two toothed wheel halves which are tensioned in relation to each other. The first toothed wheel half includes a hollow cylindrical collar with a groove, to which the second toothed wheel half is secured in a form-fitting engagement by a securing element inserted into the groove. The divided tooth wheel takes up a minimum amount of space from the axial direction and has two halves which are permanently connected together. The second toothed wheel half has a radially extending recess and the securing element is designed as an elastically shapeable ring which is arranged in a receiving chamber defined by the groove and the recess and the two toothed wheel halves are permanently joined together.

3 Claims, 4 Drawing Sheets

(56) References Cited

U.S. PATENT DOCUMENTS

Figure 1:
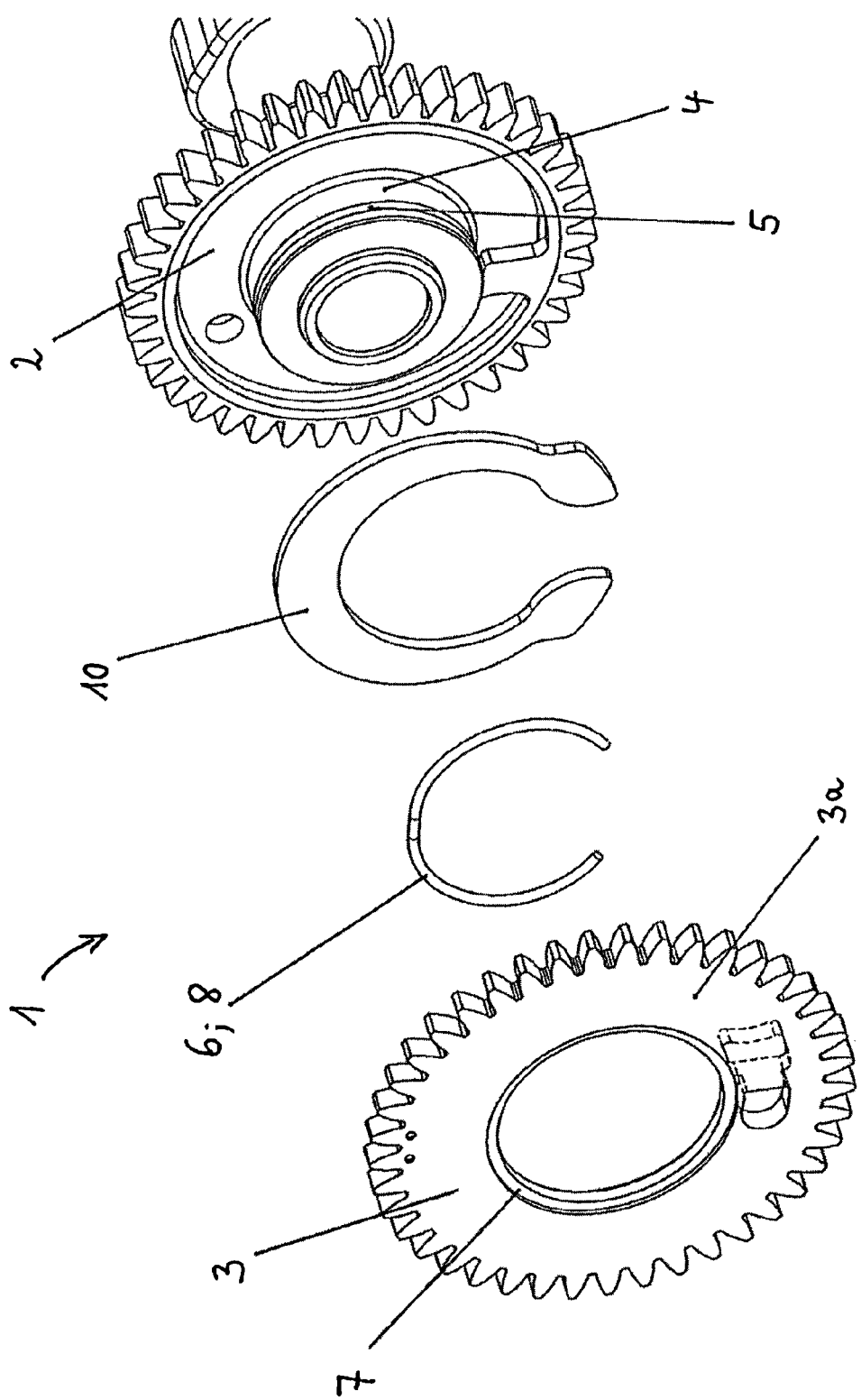

| | | | |
|---|---|---|---|
| 4,947,707 A * | 8/1990 | Koenneker | 464/68.1 |
| 5,181,433 A * | 1/1993 | Ueno et al. | 74/409 |
| 5,492,029 A * | 2/1996 | Obrist | 74/409 |
| 5,791,190 A * | 8/1998 | Konno | 74/411 |
| 5,870,928 A * | 2/1999 | Genter et al. | 74/440 |
| 6,415,674 B1 * | 7/2002 | Davis et al. | 74/409 |
| 6,419,061 B1 * | 7/2002 | Ring et al. | 192/45.004 |
| 6,661,986 B2 * | 12/2003 | Kitayama | 399/167 |
| 7,086,302 B2 * | 8/2006 | Ask et al. | 74/409 |

OTHER PUBLICATIONS

English translation of PCT/ISA/237 Form (Seven (7) pages).
German Office Action dated Apr. 14, 2009, and machine-generated partial English translation (6 pages).

* cited by examiner

DIVIDED TOOTH WHEEL

CROSS-REFERENCE TO RELATED APPLICATIONS

This application is related to U.S. patent application Ser. No. 13/122,292, entitled "Divided Toothed Wheel", filed on Apr. 1, 2011.

BACKGROUND AND SUMMARY OF THE INVENTION

Exemplary embodiments of the invention relate to a divided toothed wheel having two toothed wheel halves braced against each other, wherein the first toothed wheel half comprises a hollow cylindrical collar, to which the second toothed wheel half is attached by a fastening element.

In the case of shafts driven via a toothed wheel drive, e.g. camshafts or compensating shafts, which in operation rotate at half or double the engine speed, it is known to use a divided toothed wheel having toothed wheel halves braced against each other as the drive element instead of simple one-piece toothed wheels. The play-free bracing of the toothed wheels avoids undesired noise propagation, which could occur, as experience has shown, when using one-piece toothed wheels because some play exists.

EP 0 205 156 B1 discloses a divided toothed wheel which consists of a first toothed wheel part and a second toothed wheel part, wherein the toothed wheel parts are braced against each other via an omega-shaped spring. The first toothed wheel part comprises a hollow cylindrical spigot-shaped collar with which it can be pushed onto a shaft and which surrounds the shaft in the mounted condition. The second toothed wheel part is pushed onto the outer periphery of the collar during mounting. The collar comprises a groove on its outer periphery, into which a snap ring is inserted, with which the second toothed wheel part is attached to the collar in an axially positive locking manner. The second toothed wheel part is supported, with its side surface facing away from the first toothed wheel part, against the snap ring.

In the figures of EP 0 205 156 B1 the snap ring is not shown. The attachment of the second toothed wheel half to the collar is merely described in the descriptive part and not shown in the drawing.

If the snap ring is removed from the groove, the second toothed wheel part can be pulled off the collar. The two toothed wheel parts are thus not connected to each other in a non-releasable manner, but rather the second toothed wheel half is merely held on the collar by a releasable positive locking connection.

A disadvantage with this known connection between the two toothed wheel halves is also that, as seen in the axial direction of the shaft, a large construction space is required because, as seen in the axial direction, the collar of the first toothed wheel half must protrude clearly beyond the side surface of the second toothed wheel half, which faces away from the first toothed wheel half, so that the groove can be produced in the collar and at the same time sufficient "substance" is also still provided at the free end of the collar in order for the collar to have the necessary strength. However, in particular in the case of camshafts or compensating shafts in internal combustion engines, the designers frequently allow only a very small construction space.

In view of the known toothed wheel discussed above, exemplary embodiments of the present invention provide a divided toothed wheel with two toothed wheel halves braced against each other, in which, as seen in the axial direction, only a minimum amount of construction space is taken up and the two toothed wheel halves are non-releasably connected to each other.

Exemplary embodiments of the present invention also provide a simple process for assembling a divided toothed wheel with two toothed wheel halves which are braced against each other, wherein, as seen in the axial direction, the two toothed wheel halves can be non-releasably connected to each other in the most space-saving manner possible.

The divided toothed wheel in accordance with the invention has two toothed wheel halves which are braced against each other, wherein the first toothed wheel half has a hollow cylindrical collar with a groove, on which collar the second toothed wheel half is attached in an axially positive locking manner by a fastening element inserted into the groove. In accordance with the invention the second toothed wheel half has a radially extending recess, and the fastening element is formed as an elastically deformable spring ring which is disposed in a receiving space defined by the groove and the recess, and connects the two toothed wheel halves to each other in a non-releasable manner. Therefore, in accordance with the invention, the two toothed wheel halves that are to be connected to each other have mutually corresponding recesses to receive the spring ring and, when the toothed wheel halves are in the assembled condition, the spring ring connects the toothed wheel halves in a positive locking and non-releasable manner. The connection is non-releasable because the second toothed wheel half cannot be pulled off the collar without destroying the spring ring and/or the second toothed wheel half.

According to an embodiment of the invention, the recess in the second toothed wheel half is formed as a relief groove that is open towards a side surface of the second toothed wheel half. This relief groove can easily be turned in the second toothed wheel half as a cut turning. When the toothed wheel halves are in the assembled condition, the recess in the second toothed wheel half overlaps with the groove disposed in the collar of the first toothed wheel half. In this way the groove in the collar and the recess in the second toothed wheel half form a receiving space open to the surroundings, in which receiving space the spring ring is disposed.

The spring ring does not protrude—or only minimally protrudes—in the axial direction beyond the side surface of the second toothed wheel half, which faces away from the first toothed wheel half. Therefore, in comparison to the connection—known from the prior art discussed above—with the snap ring disposed axially outside the second toothed wheel half, the joint region, i.e., the region in which the positive locking connection between the two toothed wheel halves is produced, is shifted into a region that is located below the second toothed wheel half. The collar of the first toothed wheel half therefore possibly has to protrude beyond the second toothed wheel half in the axial direction only to a minimum extent in order to ensure the required strength for the collar. The construction space required in the axial direction is thus minimized.

According to another embodiment of the invention the space receiving the spring ring is not open to the surroundings but is formed as a closed receiving space which is formed by the grooves overlapping each other in the assembled condition, which grooves are disposed on the one hand in the collar of the first toothed wheel half and on the other hand in the second toothed wheel half. In order to achieve this, the recess in the second toothed wheel half is formed as a groove disposed between the two side surfaces of the second toothed wheel half. When the divided toothed wheel is in the assembled condition the spring ring producing the positive locking connection cannot be seen from the outside. It is totally covered by the second toothed wheel half and does not protrude beyond its side surface facing away from the first toothed wheel half. In this embodiment of the invention the spring ring is no longer accessible from the outside once assembly is complete. The second toothed wheel half cannot then be pulled off without the spring ring and/or the second toothed wheel half and/or the collar being destroyed. The construction space required in the axial direction is accordingly minimized to a considerable degree in this embodiment.

In both embodiments of the invention the spring ring can be formed in a cost-effective manner as a simple wire flexing part.

The process in accordance with the invention for assembling a divided toothed wheel with two toothed wheel halves braced against each other starts with a first toothed wheel half which has a hollow cylindrical collar with a groove. A second toothed wheel half is pushed onto the collar, wherein the second toothed wheel half is attached in an axially positive locking manner to the collar by a fastening element that is inserted into the groove. In accordance with the invention, in the second toothed wheel half a radially extending recess is provided which at least partially overlaps with the groove when the toothed wheel is in the assembled condition, and before the second toothed wheel half is pushed onto the collar an elastically deformable spring ring is inserted into the groove, which spring ring is elastically deformed by the second toothed wheel part during this pushing movement in such a way that the second toothed wheel half can be pushed onto the collar until it reaches the joint position, wherein, upon the joint position being reached, the spring ring springs back into the recess thus forming the axially positive locking connection.

With the process in accordance with the invention a non-releasable connection between the two toothed wheel halves can easily be produced and only minimum construction space is required in the axial direction. The assembled two-part toothed wheels can therefore be produced and have a clearly smaller axial extension than the known toothed wheels discussed above. In particular, when used in internal combustion engines, e.g. on camshafts or compensating shafts, construction space can be saved in this manner or available construction space can be optimally exploited.

BRIEF DESCRIPTION OF THE DRAWING FIGURES

Figure 2:
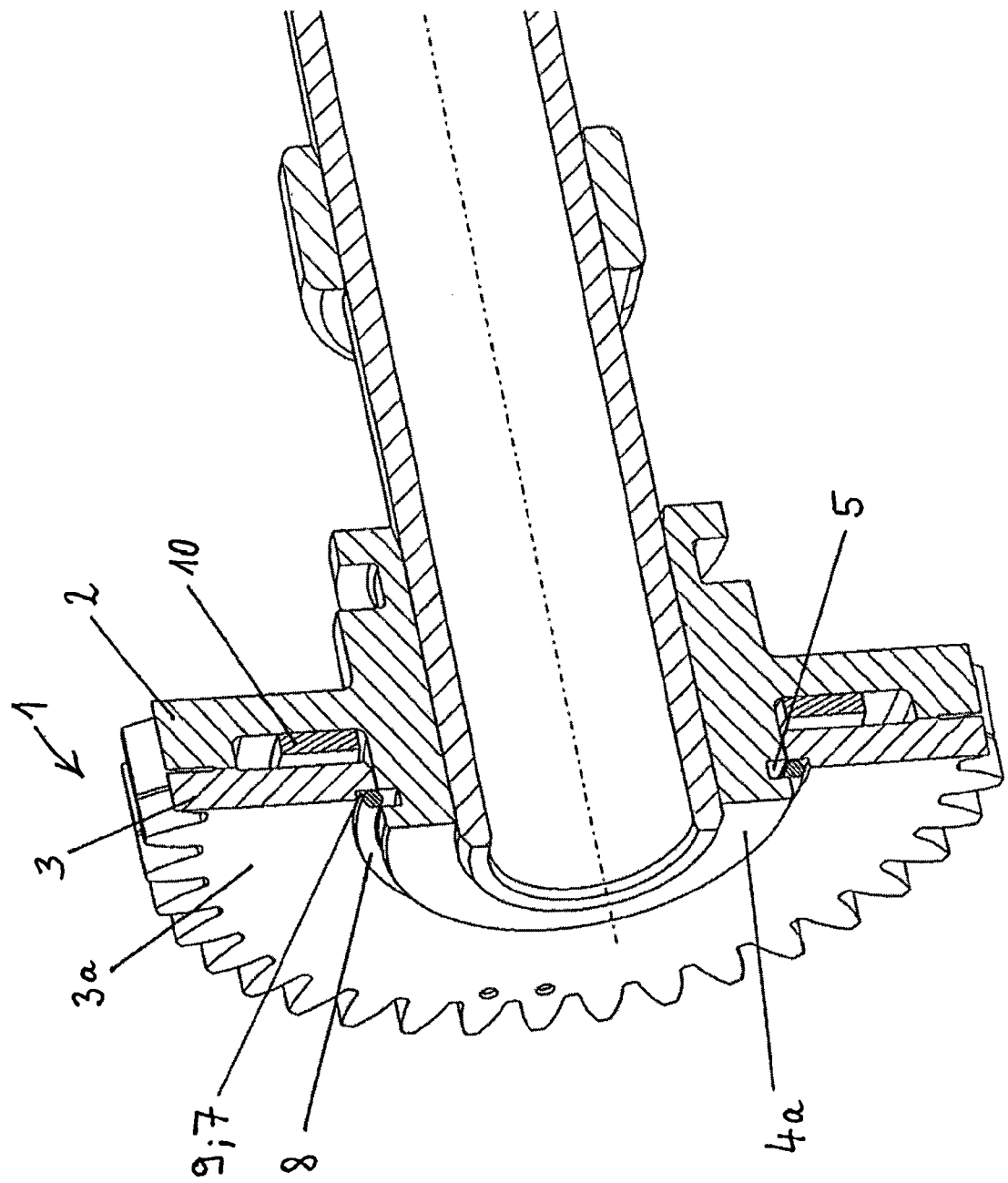
Figure 3:
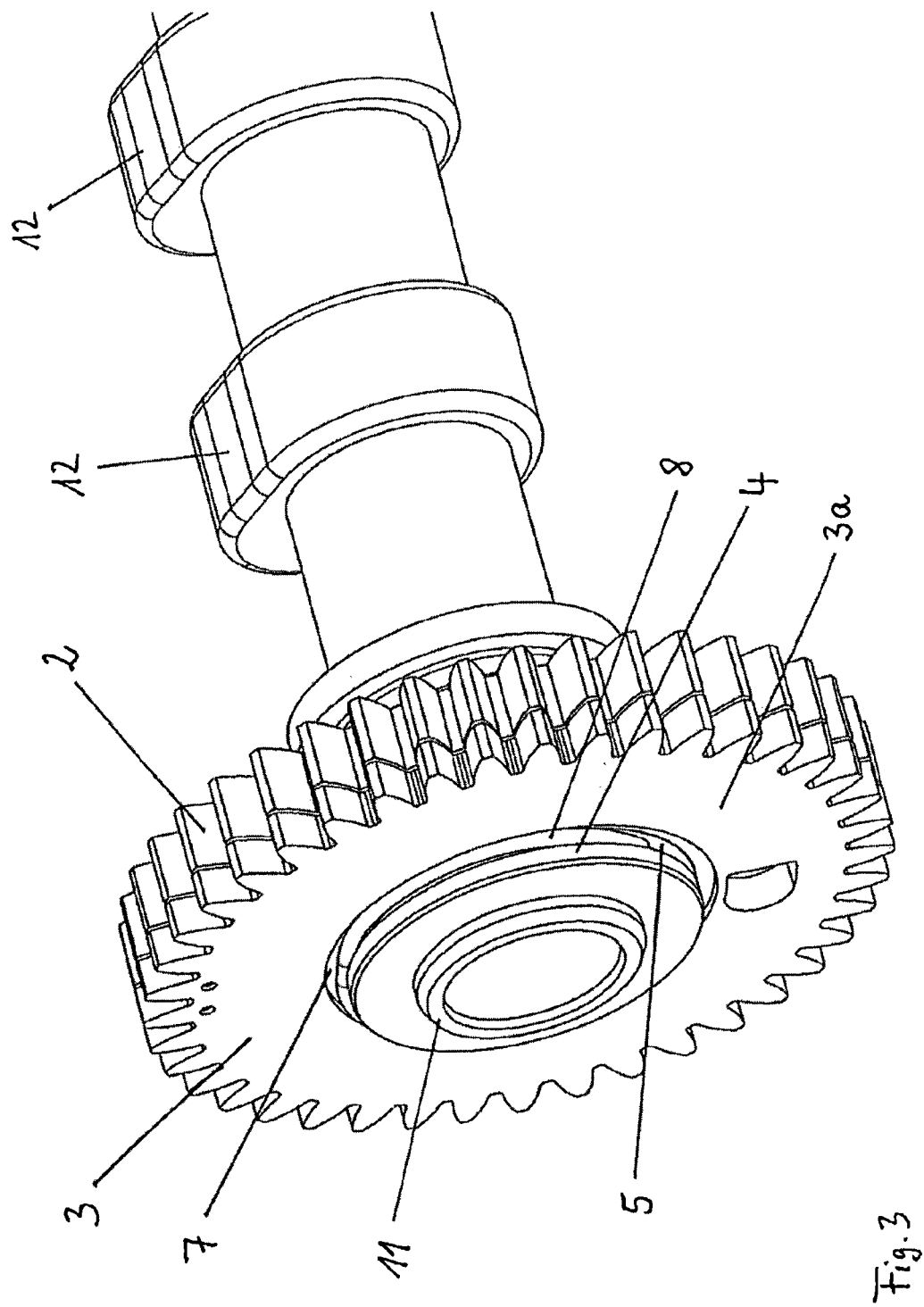
Figure 4:
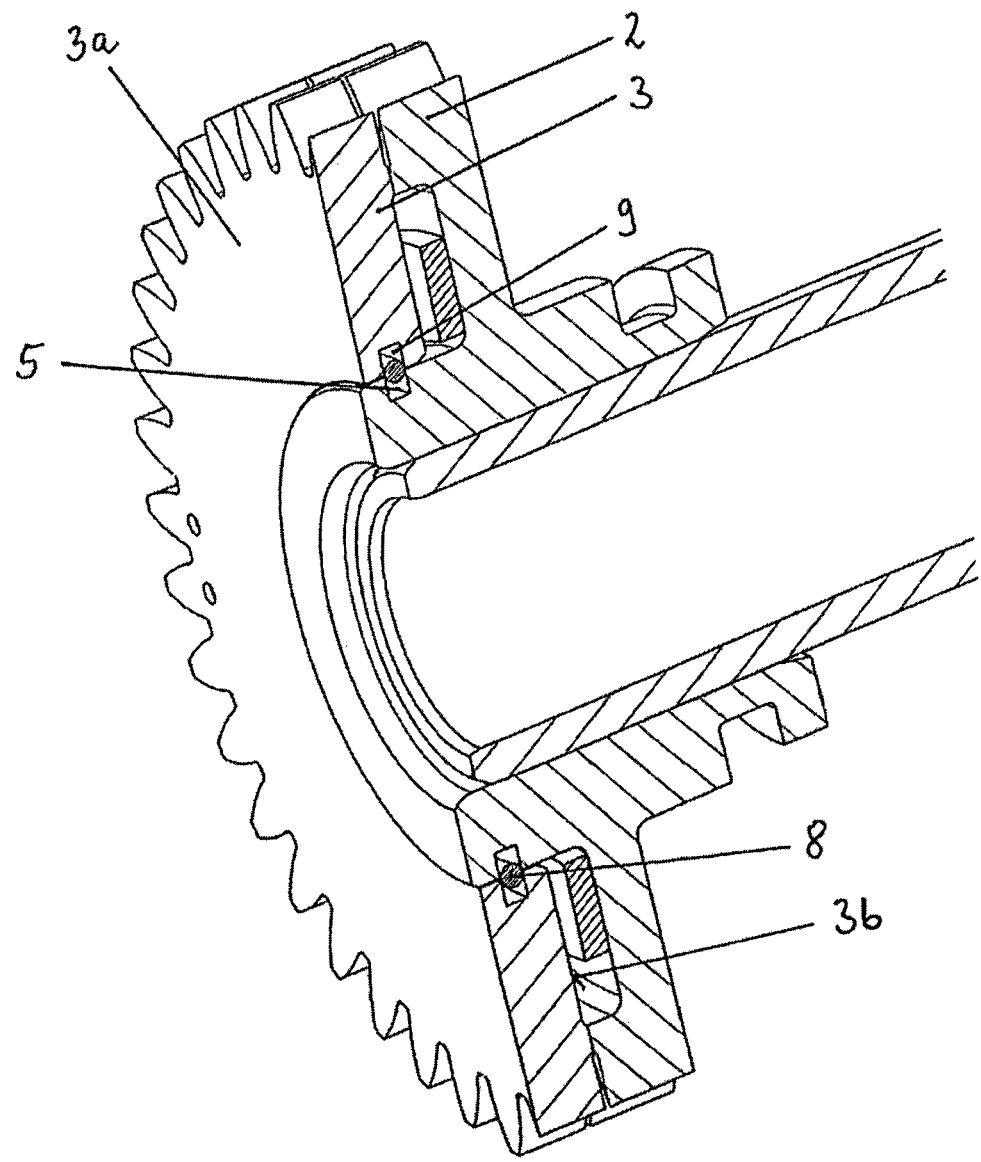

The invention will be described in more detail hereinunder with the aid of a drawing in which, in detail:

FIG. 1 is an exploded view of the divided toothed wheel which is disposed at the end of a shaft, FIG. 2 is a radial half-cross-sectional view of a divided toothed wheel in the assembled condition in accordance with a first exemplary embodiment of the present invention, FIG. 3 is a perspective view of a divided toothed wheel in the assembled condition, FIG. 4 is a radial half-cross-sectional view of a divided toothed wheel in the assembled condition in accordance with a second exemplary embodiment of the present invention.

DETAILED DESCRIPTION

A first embodiment of the invention will be described hereinunder with the aid of FIGS. 1 to 3.

FIG. 1 shows an exploded view of the individual components of the divided toothed wheel in accordance with the invention according to the first embodiment of the invention.

In a known manner a spring element 10 is disposed between the two toothed wheel halves 2, 3, which spring element in the assembled condition is supported on the one hand on the first toothed wheel half 2 and on the other hand on the second toothed wheel half 3. The two toothed wheel halves are braced against each other in the assembled condition by this spring element 10. The first toothed wheel half 2 has an axially extending collar 4. A groove 5 is disposed in the collar 4.

The spring ring 8 formed as a wire flexing part that is inserted into the groove 5 before the second toothed wheel half 3 is pushed onto the collar 4. On the side surface 3a of the second toothed wheel half 3, which faces away from the first toothed wheel half 2, a recess 7 is disposed which is formed as a relief groove. In the illustrated exemplified embodiment this relief groove has been simply turned or milled into the second toothed wheel half.

When the second toothed wheel half 3 is being pushed onto the collar 4 the spring ring 8 inserted into the groove 5 is elastically deformed, i.e. compressed. It thus enters the groove 5 and frees a path for the second toothed wheel half 3. The second toothed wheel half can thus be pushed further onto the collar 4 until it reaches its joint position on the collar 4. When the joint position is reached, the recess 7 and the groove 5 at least partially overlap and the elastically compressed spring ring 8 springs back into the recess 7. In this way an axially positive locking connection is formed between the two toothed wheel halves 2, 3 and cannot then be released without the spring ring 8 and/or the second toothed wheel half 3 and/or the collar 4 being destroyed.

FIG. 2 shows the divided toothed wheel 1 in accordance with the invention in the assembled condition. The spring ring 8 is positioned in the receiving space defined by the groove 5 and the recess 7. Although the spring ring 8 is still accessible from outside, it can no longer be removed from the receiving space. The two toothed wheel halves are thus connected to each other in a non-releasable manner.

The collar 4 protrudes with its free end 4a possibly only very slightly beyond the side surface 3a of the second toothed wheel half 3, and in fact only to an extent which ensures the required strength for the collar 4 provided with the groove 5. In this way the assembled toothed wheel extends to a minimum degree axially and takes up minimum installation space when seen in the axial direction.

FIG. 3 illustrates the divided toothed wheel 1 in accordance with the invention in a perspective view. It can clearly be seen that the pipe 11 of a camshaft fitted with cams 12, on which pipe the divided toothed wheel is mounted in the illustrated exemplified embodiment, protrudes only to a very small extent in the axial direction beyond the collar 4 of the first toothed wheel half 2. The divided toothed wheel therefore terminates almost flush with the collar 4 in the illustrated exemplified embodiment. An embodiment is also feasible in which the pipe terminates precisely flush with the collar 4 so that no additional axial construction space beyond the divided toothed wheel 1 is required for the pipe. It is also clear to see that the collar 4 of the first toothed wheel half 2 protrudes only to a very slight extent axially beyond the outer side surface 3a of the second toothed wheel half 3. The assembled divided toothed wheel 1 thus takes up only a very small axial construction space. An embodiment is also feasible in which the collar 4 of the first toothed wheel half 2 does not protrude beyond the outer side surface 3a of the second toothed wheel half 3.

A second embodiment of the invention is described hereinunder with the aid of FIG. 4.

If one imagines that FIG. 2 does not show the whole second toothed wheel half 3 but only one half of a second toothed wheel half 3 cut in a vertical plane, then the recess 7 constitutes one half of a groove 9 (cf. FIG. 4) that is disposed between the outer side surfaces 3a, 3b of the second toothed wheel half 3. In this case, the surface designated by the reference 3a in FIG. 2 would form the cut surface lying in the plane of cut of the cut-open second toothed wheel half 3 and not the outer side surface of the second toothed wheel half 3. This corresponds to the second embodiment of the invention as illustrated in FIG. 4.

According to the second embodiment of the invention, a groove 9 is provided in the second toothed wheel half 3 and is disposed in the region between the two outer side surfaces 3a, 3b of this toothed wheel half. After the toothed wheel has been assembled, the spring ring 8 is located in a receiving space that is closed off from the surroundings and is formed by the mutually overlapping grooves 5 (in the collar 4) and 9 (in the second toothed wheel half). The receiving space receiving the spring ring 8 is not accessible from outside. After the toothed wheel has been assembled, the spring ring 8 can no longer be reached with a tool and forms—in conjunction with the grooves 5 and 9—an axially positive locking, non-releasable connection between the toothed wheel halves 2, 3.

In the second embodiment of the invention a particularly compact construction is achieved for the divided toothed wheel which is closed with respect to the outside and takes up a particularly small amount of construction space in the axial direction. It is also advantageous that no foreign bodies or particles of dirt from outside can enter or collect in the receiving space.

The manner of proceeding during assembly of the divided toothed wheel in this second embodiment of the invention is the same as in the first embodiment of the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:
1. A divided toothed wheel, comprising:
a first toothed wheel half; and
a second toothed wheel half, the first and second toothed wheel halves being braced against each other,
wherein the first toothed wheel half has a hollow cylindrical collar with a groove, to which collar the second toothed wheel half is attached in an axially positive locking manner by a fastening element inserted into the groove, wherein the second toothed wheel half has a radially extending recess, and the fastening element is formed as an elastically deformable spring ring connecting the two toothed wheel halves to each other in a non-releasable manner, wherein the recess in the second toothed wheel half is a groove disposed between the two side surfaces of the second toothed wheel half, wherein the elastically deformable spring ring is disposed in a receiving space that is defined by the grooves of the first and second toothed wheel halves, that is closed off from surroundings, and that is not externally accessible.

2. The toothed wheel as claimed in claim 1, wherein the elastically deformable spring ring is a wire flexing part.

3. A process for assembling a divided toothed wheel with a first toothed wheel half and a second toothed wheel half, the first and second toothed wheel halves being braced against each other, wherein the first toothed wheel half has a hollow cylindrical collar with a groove and the second toothed wheel half is pushed onto the collar, wherein the second toothed wheel half is attached in an axially positive locking manner to the collar by a fastening element that is inserted into the groove, wherein the second toothed wheel half has a radially extending groove between two side surfaces of the second toothed wheel half and overlapping with the groove of the first toothed wheel half when the toothed wheel is in the assembled condition, and before the second toothed wheel half is pushed onto the collar an elastically deformable spring ring is inserted into the groove, which spring ring is elastically deformed by the second toothed wheel part during this pushing movement in such a way that the second toothed wheel half can be pushed onto the collar until it reaches the joint position, wherein, upon the joint position being reached, the spring ring springs back into the groove of the second toothed wheel half to form the axially positive locking connection, wherein in the assembled condition the spring ring is disposed in a receiving space that is defined by the grooves of the first and second toothed wheel halves, that is closed off from surroundings, and that is not externally accessible.

* * * * *